(12) United States Patent
Bourdon et al.

(10) Patent No.: US 7,822,202 B2
(45) Date of Patent: Oct. 26, 2010

(54) METHOD AND DEVICE FOR PROCESSING A SEQUENCE OF VIDEO IMAGES

(75) Inventors: Pascal Bourdon, Le Grand Fougeray (FR); Laurent Blonde, Thorigne-Fouillard (FR); Thierry Borel, Noyal sur Vilaine (FR)

(73) Assignee: Thomson Licensing, Boulogne-Billancourt (FR)

( * ) Notice: Subject to any disclaimer, the term of this patent is extended or adjusted under 35 U.S.C. 154(b) by 943 days.

(21) Appl. No.: 11/698,013

(22) Filed: Jan. 25, 2007

(65) Prior Publication Data
US 2007/0172057 A1 Jul. 26, 2007

(30) Foreign Application Priority Data
Jan. 26, 2006 (EP) .................................. 06290155

(51) Int. Cl.
*H04N 7/167* (2006.01)
(52) U.S. Cl. .......................................... 380/210; 380/54
(58) Field of Classification Search ....................... None
See application file for complete search history.

(56) References Cited

U.S. PATENT DOCUMENTS

| | | | | |
|---|---|---|---|---|
| 2002/0083324 A1* | 6/2002 | Hirai | ........................... | 713/176 |
| 2002/0097328 A1* | 7/2002 | Henderson et al. | ........... | 348/241 |
| 2002/0168069 A1* | 11/2002 | Tehranchi et al. | ............ | 380/235 |
| 2004/0218761 A1* | 11/2004 | Gustafson | ................... | 380/238 |

FOREIGN PATENT DOCUMENTS

| | | |
|---|---|---|
| EP | 1237369 | 9/2002 |
| EP | 1345428 | 9/2003 |
| WO | WO0133846 | 5/2001 |

OTHER PUBLICATIONS

Search Report dated Aug. 7, 2006.

* cited by examiner

*Primary Examiner*—Gilberto Barron, Jr.
*Assistant Examiner*—David Le
(74) *Attorney, Agent, or Firm*—Robert D. Shedd; Jeffrey M. Navon

(57) ABSTRACT

The invention discloses a new modulation scheme to prevent illegal copy in movie theaters. None of the existing modulation schemes make the right assumptions to modelize a camcorder device. In such classical schemes, camcorders are always considered as sampling devices without taking into account the effects of shutter speed. The shutter of the camcorder is classically compared to a low-pass filter. As a result, modulation effects can be easily removed by setting up shutter speed to low values (low cutoff frequency). The right mathematical modelization of the shutter effect shows that, in the spectral domain, the behavior of the camcorder is close to a cardinal sine function with a main lobe and sidelobes. Consequently, according to the invention, it is proposed to select a modulation frequency that not only generates visual artifacts once recorded by the camcorder under shutter-free conditions, but that can also generate artifacts despite low shutter speed settings by going through sidelobe of the shutter spectrum.

15 Claims, 5 Drawing Sheets

METHOD AND DEVICE FOR PROCESSING A SEQUENCE OF VIDEO IMAGES

This application claims the benefit, under 35 U.S.C. §119 of EP Patent Application 06290155.8, filed Jan. 26, 2006.

FIELD OF THE INVENTION

The invention relates to a method for processing a sequence of video images represented by their video signals comprising a modulation step for modulating temporally the amplitude of the brightness of a set of pixels of each image of the sequence around a brightness value to be displayed for said image, this modulation being not visible to the human eye.

BACKGROUND OF THE INVENTION

The visual contents, whether these be fixed or moving images, are in general creations that benefit from guarantees of exclusivity associated with the creator's rights. Their reproduction is in general permitted only within a strictly defined framework that allows the creators and their beneficiaries to be remunerated.

To ensure that these legal rules are complied with correctly, many systems have been developed to prevent illegal copies or to make the quality of the copies sufficiently degraded to make them unusable.

Within this context, the patent application EP 1 237 369 aims to combat the copying of images by means of a camera while they are being displayed, for example using a camcorder in a movie theatre. In this document, it has been proposed to modulate temporally the amplitude of the brightness of selected pixels representing an anti-piracy message around the value to be displayed at a high rate that makes the message invisible to the human eye but generates artifacts in the sequence filmed by the camcorder. Such a solution requires a modulation at a rate higher than the flicker fusion frequency, which is of around 50 Hz, and therefore applies only to systems having a high image refresh rate, at least of around 100 Hz. Applied to systems with a lower display rate (50 Hz or 60 Hz for example), the modulation could be visible to the human eye and would visibly degrade the rendition of the displayed image.

The major drawback of this method is that the anti-piracy message can be easily removed by setting up the camcorder to low shutter speed settings.

SUMMARY OF THE INVENTION

It is an object of the present invention to elaborate a method which is both able to generate aliasing artifacts on camcorder copies of a digital motion picture, and resist to low shutter speed settings.

In the present invention, the mathematical modelization of the shutter effect shows that, in the spectral domain, the behavior of the camcorder is close to a cardinal sine function with a main lobe and sidelobes. Consequently, according to the invention, it is proposed to select a modulation frequency that not only generates visual artifacts once recorded by the camcorder under shutter-free conditions, but that can also generate artifacts despite low shutter speed settings by going through sidelobes of the shutter spectrum.

Thus, the object of the invention is solved by a method for processing a sequence of video images represented by their video signals comprising a modulation step for modulating temporally the amplitude of the brightness of a set of pixels of each image of the sequence around a brightness value to be displayed for said image, wherein said modulation is chosen to be not visible to the human eye while simultaneously generating artifacts due to aliasing when said video images are captured by a digital video capturing device. According to the invention, the modulation frequency is selected to be in a limited frequency range centered on a local extremum of the function $\text{sinc}(\pi f \tau)$, where the function sinc is the cardinal sine function and $\tau$ is the shutter integration time of the digital video capturing device.

In a standard case, the shutter integration time $\tau$ is adjusted to the inverse of the sampling frequency $f_s$ of the digital video capturing device which is for example a PAL camcorder or a NTSC camcorder.

According to the invention, in that standard case, to defeat PAL camcorders (sampling frequency equal to 50 Hz), the modulation frequency is thus selected to be in a limited frequency range centered on the frequency 71.5 Hz or 122.9 Hz. For a NTSC camcorders (sampling frequency equal to 60 Hz), the modulation frequency is selected to be in a limited frequency range centered on the frequency 85.8 Hz or 147.5 Hz.

The invention concerns also a device for processing a sequence of video images represented by their video signals comprising a modulator for modulating temporally the amplitude of the brightness of a set of pixels of each image of the sequence around a brightness value to be displayed for said image, wherein the modulation is chosen to be not visible to the human eye while simultaneously generating artifacts due to aliasing when said video images are captured by a digital video capturing device. According to the invention, the modulation frequency is selected to be in a limited frequency range centered on a local extremum of the function $\text{sinc}(\pi f \tau)$, where the function sinc is the cardinal sine function and $\tau$ is the shutter integration time of the digital video capturing device.

As mentioned before, when the shutter integration time $\tau$ is adjusted to the inverse of the sampling frequency $f_s$ of the digital video capturing device, the modulation frequency used by the modulator is selected to be in a limited frequency range centered on the frequency 71.5 Hz or 122.9 Hz to defeat PAL camcorders and selected to be in a limited frequency range centered on the frequency to 85.8 Hz or 147.5 Hz to defeat NTSC camcorders.

Furthermore, the images computed by the modulator are outputted at a frame rate that is equal to or higher than twice the modulation frequency Preferably, this frame rate is equal to a multiple of the frame rate at which the images are inputted into the modulator.

BRIEF DESCRIPTION OF THE DRAWINGS

Exemplary embodiments of the invention are illustrated in the drawings and are explained in more detail in the following description. In the drawings.

DESCRIPTION OF PREFERRED EMBODIMENTS

The invention specifies a new modulation system to prevent illegal copy in movie theaters. Although other modulation schemes have already been proposed to defeat camcorders, none of those make the right assumptions to modelize a camcorder device. In such classical schemes, camcorders are always considered as sampling devices only while a good model should take into account the effects of shutter speed. The shutter of the camcorder is classically compared to a variable cutoff frequency low-pass filter located before the sampling process in a functional scheme. As a result, modulation effects can be easily removed by setting up shutter speed to low values (low cutoff frequency). In the present invention, the mathematical modelization of the shutter effect shows that, in the spectral domain, the behavior of the camcorder is close to a cardinal sine function with a main lobe and sidelobes. Consequently, according to the invention, it is proposed to select a modulation frequency that not only generates visual artifacts once recorded by the camcorder under shutter-free conditions, but that can also generate artifacts despite low shutter speed settings by going through sidelobes of the shutter spectrum.

Before explaining in detail the invention, some information about the human visual system, the Fourier transformation, the sampling process and the amplitude modulation are given.

According to several psychophysical studies, the Human Visual System or HVS is selectively sensitive to different ranges of both spatial and temporal frequencies. These studies usually consist in analyzing the reactions of a human observer to cyclic (sinusoidal) variations of brightness in either spatial and/or temporal domains. The term "spatial frequency" refers to the number of cycles per degree of visual angle, whereas the term "temporal frequency" refers to the number of cycles per second. In the present application, the term "frequency" will refer to temporal frequency.

Figure 1:
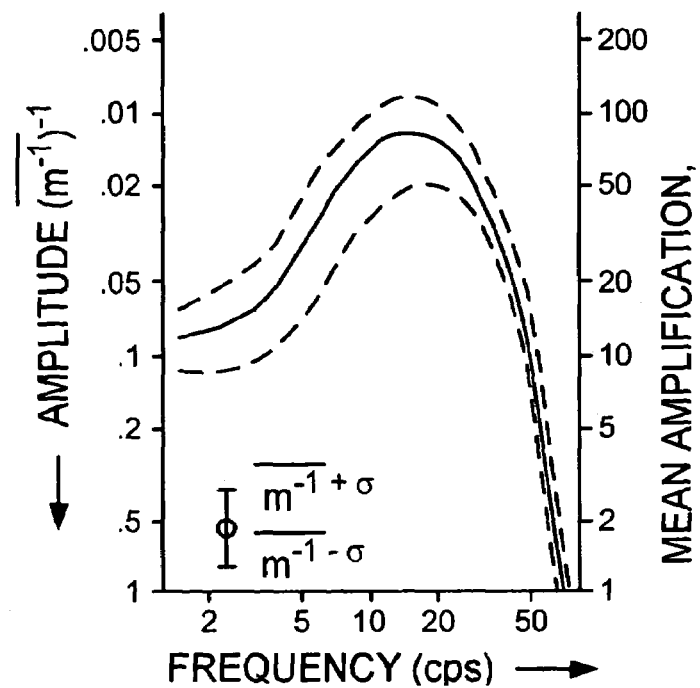
FIG. 1 is a diagram illustrating the flicker sensitivity of the human eye.

The brightness flicker sensitivity of the HSV according to frequency is illustrated by FIG. 1. The brightness flicker becomes imperceptible for a frequency equal to or greater than 50 Hz.

Fourier transformation is a well-known tool to analyze a time-varying function in the frequency (or "spectral") domain. Let x(t) be a continuous function. Its corresponding Fourier transform can be written as:

$$F[x(t)] = X(f) = \int_{-\infty}^{+\infty} x(t)e^{-j2\pi ft} dt \quad (1)$$

The corresponding inverse Fourier transform is:

$$F^{-1}[X(f)] = x(t) = \int_{-\infty}^{+\infty} X(f)e^{j2\pi ft} df \quad (2)$$

A Fourier transform is defined by an amplitude and a phase angle although amplitude is the only interesting data to focus on. Examples of conversions from temporal to frequency domains of well-known functions and operators are given in the following table 1:

| $x(t) = F^{-1}[X(f)]$ | $X(F) = F[x(t)]$ |
|---|---|
| 1 | $\delta(f)$ |
| $e^{-j2\pi f_0 t}$ | $\delta(f + f_0)$ |
| $a \cdot x(t) + b \cdot y(t)$ | $a \cdot X(f) + b \cdot Y(f)$ |
| $x(t) \cdot y(t)$ | $X(F) * Y(F)$ |
| $x(t) * y(t)$ | $X(F) \cdot Y(f)$ |
| $e^{-j2\pi f_0 t} \cdot x(t)$ | $\delta(f + f_0) * X(f) = X(f + f_0)$ |
| $\cos(2\pi f_0 t) = \dfrac{e^{-j2\pi f_0 t} + e^{j2\pi f_0 t}}{2}$ | $\dfrac{1}{2}(\delta(f + f_0) + \delta(f - f_0))$ |
| $\delta(t - t_0)$ | $e^{-j2\pi f t_0}$ |
| $\displaystyle\sum_{n=-\infty}^{n=+\infty} \delta(t - nT_S)$ | $\displaystyle\sum_{n=-\infty}^{n=+\infty} \dfrac{1}{T_S}\delta\!\left(f - \dfrac{n}{T_S}\right)$ |

Fourier transformation turns out to be very useful when it comes to analyzing Analog-to-Digital and Digital-to-Analog Conversion schemes (ADC/DAC). The conversion of any function from analog to digital always starts with a time sampling process, which consists in switching from continuous to discrete representation spaces. This discretization process can be mathematically modeled by a multiplication between the function and an infinite series of Dirac's delta functions separated by $T_s$, where $T_s$ is the sampling period and $$f_S = \frac{1}{T_S}$$

is the sampling frequency:

$$\{x_n\} = \sum_{n=-\infty}^{n=+\infty} x(nT_S) = x(t) \cdot \sum_{n=-\infty}^{n=+\infty} \delta(t - nT_S) \quad (3)$$

Figure 2:
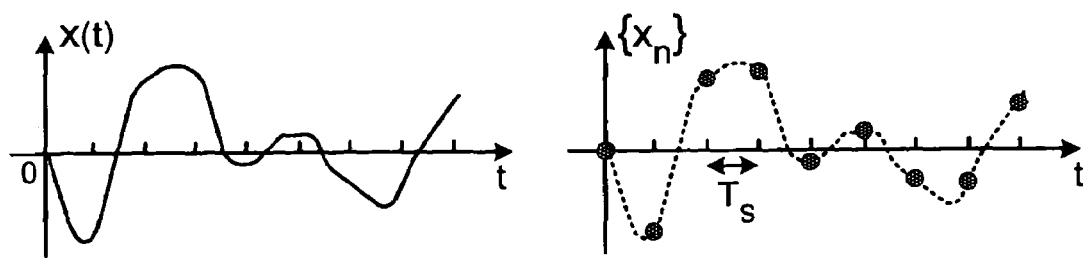
FIG. 2 is a couple of diagrams illustrating the uniform sampling of a function x(t)

The sampling process of the function x(t) is illustrated by FIG. 2. Using transforms presented in Table 1, the Fourier transform of discrete function $\{x_n\}$ can be written as follows:

$$F[\{x_n\}] = F\!\left[x(t) \cdot \sum_{n=-\infty}^{n=+\infty} \delta(t - nT_S)\right]$$

$$= F[x(t)] * f\!\left[\sum_{n=-\infty}^{n=+\infty} \delta(t - nT_S)\right]$$

-continued $$= X(f) * \sum_{n=-\infty}^{n=+\infty} \frac{1}{T_S} \delta\left(f - \frac{n}{T_S}\right)$$

$$= f_S \sum_{n=-\infty}^{n=+\infty} X(f - nf_S)$$

Figure 3:
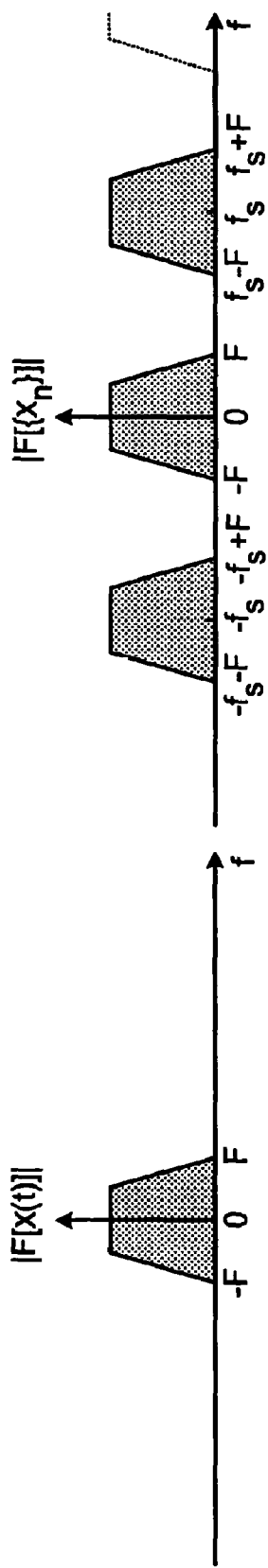
FIG. 3 is a couple of diagrams illustrating the sampling process inn the time domain and in the frequency domain.
Figure 4:
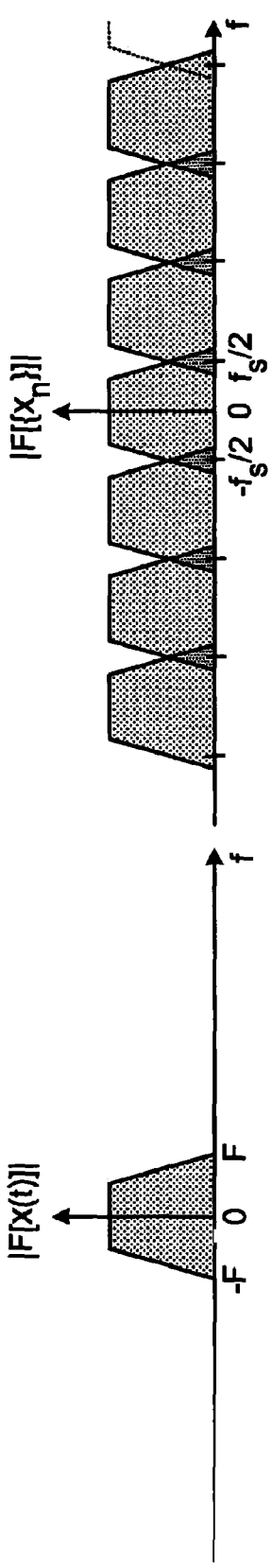
FIG. 4 is a couple of diagrams illustrating a sampling operation with a low sampling frequency.

In other words, sampling a function in the space/time domain introduces a periodization in the frequency domain as illustrated by FIG. 3. In this figure, the spectrum of the function x(t) is spread over the frequency band [0-F]. As shown by this figure, x(t) can be fully recovered from $\{x_n\}$ because F[x(t)] can be recovered from a low-pass filtering operation on F[$\{x_n\}$]. However, in order to perform lossless Analog-to-Digital/Digital-to-Analog conversions, special care must be taken regarding chosen sampling times/frequencies. If the sampling frequency $f_s$ is lower than 2F, the periods of F[x(t)] tend to overlap, thus leading to the spectrum F[$\{x_n\}$] illustrated by FIG. 4. This new spectrum does not allow to recover the original spectrum F[x(t)]. The overlapping phenomenon, called aliasing, can be prevented if the well-known Nyquist-Shannon sampling theorem is respected. This theorem states that when sampling a signal (e.g., converting from an analog signal to digital), the sampling frequency must be greater than twice the bandwidth of the input signal in order to be able to reconstruct the original perfectly from the sampled version: $f_s$>2F.

Therefore, as any sampling device, a camcorder can generate aliasing artifacts. In the case of an anti-piracy or anti-camcorder system, it can be useful to make the camcorder generating such aliasing artifacts. Since it is not possible to act on the sampling frequency $f_s$ of the camcorder (50 Hz PAL/60 Hz NTSC for interleaved fields), the principle of the invention is to increase the bandwidth F of the video signal by using amplitude modulation with specific modulation frequencies that are not filtered by the camcorder.

Amplitude modulation (AM) is a form of modulation in which the amplitude of a carrier signal changes depending on the amplitude of a modulating signal. A basic AM operation consists in multiplying the modulating signal, for example x(t), with the carrier signal c(t) of frequency $f_m$. The carrier signal c(t) is defined as:

$$c(t) = \beta \cos(2\pi f_m t)$$

The amplitude-modulated signal $x_{AM}(t)$ is:

$$x_{AM}(t) = x(t) \cdot (1 + c(t)) = x(t) + x(t) \cdot \beta \cos(2\pi f_m t)$$

The Fourier transform of the signal $x_{AM}(t)$ is:

$$X_{AM}(f) = X(f) + X(f) * \frac{1}{2}(\delta(f - f_m) + \delta(f + f_m))$$

$$= X(f) + \frac{1}{2}(X(f - f_m) + X(f + f_m))$$

Figure 5:
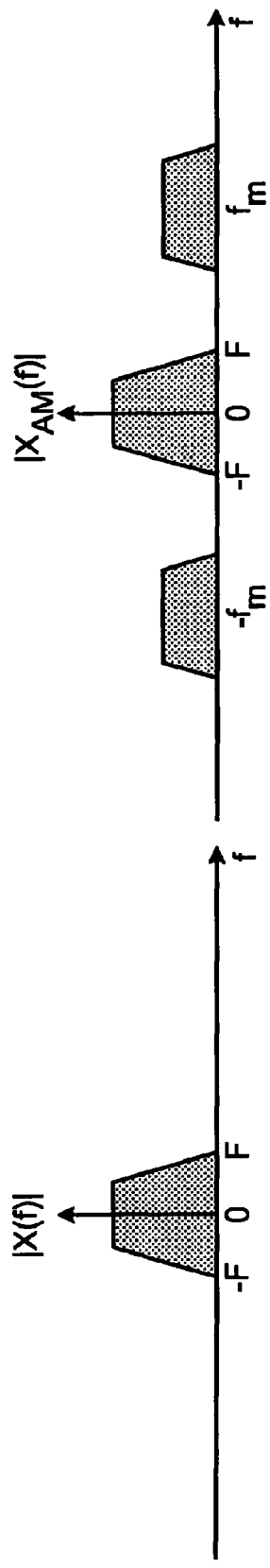
FIG. 5 is a couple of diagrams showing the frequency bandwidth of a base band signal and an amplitude-modulated signal.

A graphical representation of this Fourier transform is given at FIG. 5. It shows the amplitude spectrum X(f) of the modulating signal and the full amplitude spectrum $X_{AM}(f)$ of the amplitude-modulated signal.

In reference to FIG. 5, it can be easily understood how useful this amplitude modulation can be to generate aliasing artifacts on a recorded video sequence. If the modulation frequency $f_m$ is high enough to increase the bandwidth of the video signal over the limit $f_s/2$ and high enough to make extra spectral content invisible to the human visual system, then this extra content will overlap during camcorder acquisition, creating artifacts a human observer is able to perceive. In order to create a warning message, modulation shall be applied to a selected set of pixels representing a warning message as disclosed in EP 1 237 369.

Until now, modulation-based anti-camcorder methods only considered camcorders as sampling devices, which is a wrong assumption as it will be seen later. In camcorder technology, the recording/sampling process of a visual signal first requires its exposure to CCD/CMOS sensors for a certain amount of time. Exposure is commonly denoted as "shutter speed", although the shutter used in most video cameras is not mechanical and although it is a time period and not a speed. Chip camera "shutter" speed simply represents the inverse of the time during which the light-induced charge is allowed to electronically build in the chip before the cycle is repeated. In the frequency domain, shutter is commonly compared to a low pass filter, with exposure time being directly related to the cutoff frequency of the filter.

For a PAL camcorder device recording 25 frames per second, the actual sampling frequency $f_s$ is 50 Hz because of the use of interlaced frames. Based on the Nyquist-Shannon sampling theorem, to generate aliasing artifacts, the modulation frequency $f_m$ should be set to any value higher than $f_s/2$, which leads us to the condition:

$f_m$>25 Hz

But, to be sure the modulation effects will not be perceived by the legal audience, the modulation frequency $f_m$ should not be located in frequency bands where a human observer can perceive flicker (see FIG. 1), hence a second condition is:

$f_m$>50 Hz

This new condition is a more constraining one. It is a well-known fact that cinema standards set refreshing rates to 24 images per second. In case of an attempt of piracy over a motion picture, setting up the shutter speed of the camcorder to 1/50, which is a standard (value for PAL camcorders), does not modify the motion since motion will never exceed 12 Hz. Furthermore, if a shutter speed of 1/50 equals a low pass filter with cutoff frequency of 50 Hz and, as the filtering process occurs before the sampling process in the camcorder, it would never be possible to generate a modulation effect that goes through the shuttering process with the condition $f_m$>50 Hz. Then aliasing artifacts generation should be impossible.

But below is given a mathematical modelization of the shutter behavior showing that the shutter is not just a low pass filter and that an appropriate amplitude modulation can generate aliasing.

Exposure time is the interval during which the CCD/CMOS sensors are exposed to incident light by the shutter, while integration time is defined as the interval during which the clocks of the camcorder are set to trap and retain charge. For a CCD, the integration starts when the CCD is cleared. It is counted from the end of clearing, until the CCD starts to read out. Although integration time is delimited by the behaviour of the readout electronics of the camcorder, it can be considered that it equals exposure time. So the shutter effect can be modelized by the following equation:

$$x_{shut}(t) = \int_{t-T}^{t} x(\tau)d\tau \qquad (3)$$

where

T is the shutter speed, x(t) is the input signal, and
$x_{shut}(t)$ is the output signal.

Once integrated, the incoming signal x(t) enters the sampling process of the camcorder. The actual model of a recorded sequence $x_{rec}(t)$ can then be written as:

$$x_{rec}(t) = \sum_{n=-\infty}^{+\infty} \left[ \int_{t-T}^{t} x(\tau)d\tau \right] \cdot \sum_{n=-\infty}^{n=+\infty} \delta(t-nT_S) \quad (4)$$

Using two changes of variable in Equation 3, it turns out $x_{shut}(t)$ can be written as:

$$\begin{aligned}
x_{shut}(t) &= \int_{t-T}^{t} x(\tau)d\tau \quad (5)\\
&= \int_{-T}^{0} x(\varphi+t)d\varphi \text{ with } \varphi = \tau - t\\
&= \int_{-\infty}^{+\infty} x(\varphi+t) \cdot rect_T\left(\varphi + \frac{T}{2}\right)d\varphi\\
&= \int_{-\infty}^{+\infty} x(\chi) \cdot rect_T\left(\chi - t + \frac{T}{2}\right)d\chi \text{ with } \chi = \varphi + t\\
&= \int_{-\infty}^{+\infty} x(\chi) \cdot rect_T\left(-\chi + t - \frac{T}{2}\right)d\chi\\
&\quad (rect_T(.) \text{ is an even function})\\
&= [x * rect_T]\left(t - \frac{T}{2}\right)
\end{aligned}$$

where $rect_T(.)$ is the rectangular function, defined as:

$$rect_T(t) = \begin{cases} 1 & \text{if } t \in \left[\frac{-T}{2}, \frac{T}{2}\right] \\ 0 & \text{else} \end{cases}$$

This result is very interesting, especially when looking at the corresponding Fourier transform of function $x_{shut}(t)$:

$$\begin{aligned}
F[x_{shut}(t)] &= F\left[[x*rect_T]\left(t - \frac{T}{2}\right)\right] \quad (6)\\
&= F[[x*rect_T](t)] \cdot e^{-j\pi fT}\\
&= F[x(t)] \cdot F[rect_T(t)] \cdot e^{-j\pi fT}\\
&= X(f) \cdot T sinc(\pi fT) \cdot e^{-j\pi fT}\\
&= X_{shut}(f)
\end{aligned}$$

Figure 6:
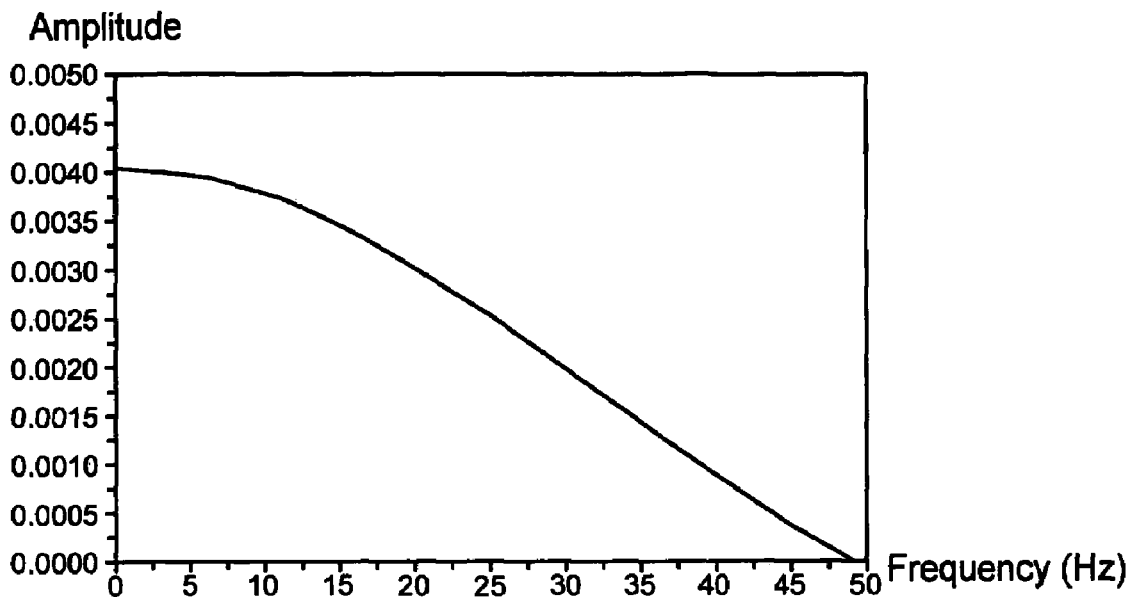
FIG. 6 illustrates the amplitude of the function sinc(πfT) for the frequency band 0-50 Hz.

While the term $e^{-j\pi fT}$ in the equation (6) has only an influence on the phase of $X_{shut}(f)$, it turns out that the term sinc ($\pi fT$) defines the actual mathematical model for the low pass filtering operation that was induced by shutter adjustment. FIG. 6 is a graphical representation of the cardinal sine function sinc($\pi fT$) for the frequency band 0-50 Hz. As it can be seen, when set to a speed of $\frac{1}{50}$, the shutter behaves as a low pass filter with a cutoff frequency of 50 Hz or even lower if a −3 dB cutoff frequency is considered. Because of that, all attempts to generate modulation artifacts will either be visible to the legal audience (for 25 Hz<$f_m$<50 Hz—see FIG. 1) or removed by the shutter (for $f_m$>50 Hz).

Figure 7:
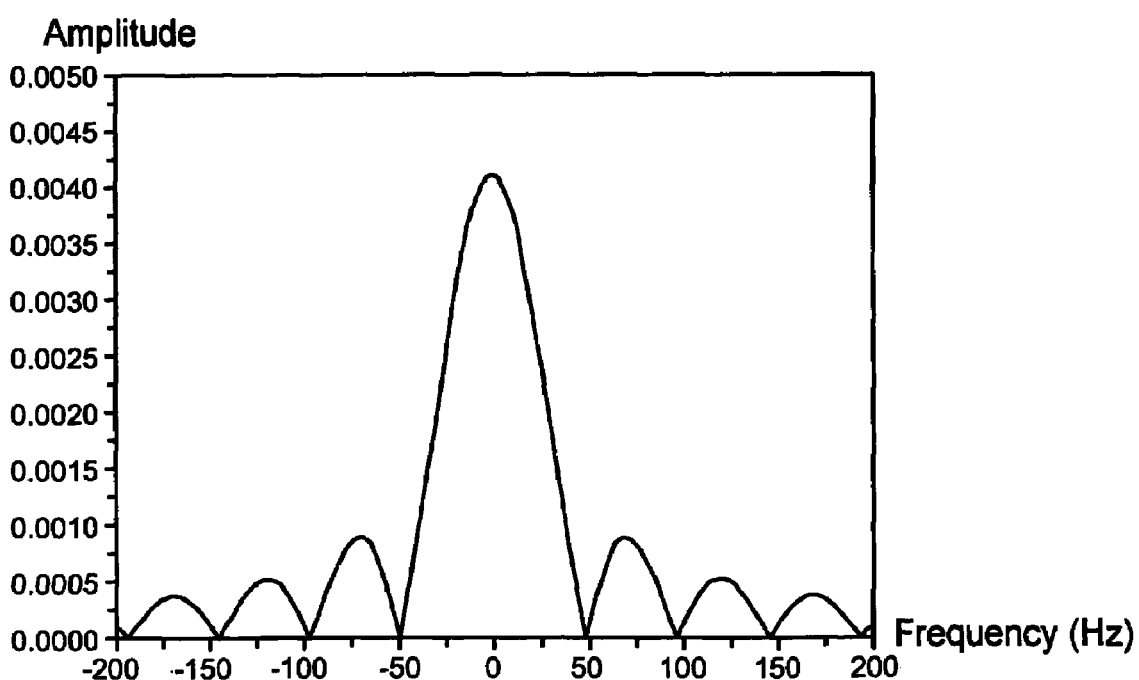
FIG. 7 illustrates the amplitude of the function sinc(πfT) for the full spectrum.

Using a mathematical model to study the effect of the shutter is not useless though. FIG. 7 shows the graphical representation of function sinc($\pi fT$) over the full frequency band, which turns out to be very interesting: although cutoff is detected at 50 Hz, a function sinc(.) presents severe sidelobe effects. This means it is still possible to let certain high frequencies go through the shutter. The function sinc(.) is known to present zero-crossing for points that are multiples of π (i.e. frequencies that are multiples of $$\frac{1}{T}$$

for sinc($\pi fT$)). In the present application, points which are worth focusing on are the ones that indicate the location of sidelobe extrema. Local extrema are found when a function has a derivative of zero:

$$\begin{aligned}
\frac{d(sinc(x))}{dx} &= 0 \quad (7)\\
\frac{x \cdot \cos(x) - \sin(x)}{x^2} &= 0\\
x \cdot \cos(x) - \sin(x) &= 0
\end{aligned}$$

It is not easy to find an analytic solution to Equation 7. But the function sinc(x) is polynomial:

$$sinc(x) = \sum_{n=0}^{+\infty} \frac{(-1)^n}{(2n+1)!} x^{2n} \quad (8)$$

Otherwise, because of its close relationship with the sine function, the sidelobe peaks of the cardinal sine will be most likely located around odd multiples of $$\pm \frac{\pi}{2}$$

(except for the interval [−π, π] which only includes the main lobe). Since it is possible to give reliable roots approximations for the equation (7), it can be numerically solved using the Newton-Raphson iterative method for finding roots:

$$\begin{aligned}
x_{n+1} &= x_n - \frac{x_n \cdot \cos(x_n) - \sin(x_n)}{d(x_n \cdot \cos(x_n) - \sin(x_n))/dx_n} \quad (9)\\
&= x_n + \frac{x_n \cdot \cos(x_n) - \sin(x_n)}{x_n \cdot \sin(x_n)}
\end{aligned}$$

where n∈[0,$n_{max}$] is the iterator, and
$x_0$ is the initialization root for every sidelobe of the function sinc(x).

The implementation scheme of the equation (9) gives the following points for the extrema of sinc(x):

| Sidelobe | Peak location | Peak location in Hz | Peak value |
|---|---|---|---|
| Main lobe | x = 0 | f = 0 | \|sinc(x)\| = 1 |
| $1^{st}$ | x = ±4.4934095 | $f = \pm \dfrac{4.4934095}{\pi T} = 71.51$ | \|sinc(x)\| = 0.2172336 |
| $2^{nd}$ | x = ±7.7252518 | $f = \pm \dfrac{7.7252518}{\pi T} = 122.95$ | \|sinc(x)\| = 0.1283746 |
| $3^{rd}$ | x = ±10.904122 | $f = \pm \dfrac{10.904122}{\pi T} = 173.54$ | \|sinc(x)\| = 0.0913252 |

These points define frequencies that can be used as modulation frequencies $f_m$ to defeat shutter speed configurations of $f_s=1/T$. As illustrated by a diagram of the FIG. 8, the sidelobes of the sampled modulated signal generates aliasing because the attenuation of the shutter spectrum gain is not strong enough around sidelobes to fully remove the modulated signal. A part of this signal will be able to go through the shutter and generates aliasing for the frequency band visible to the human eye.

Figure 8:
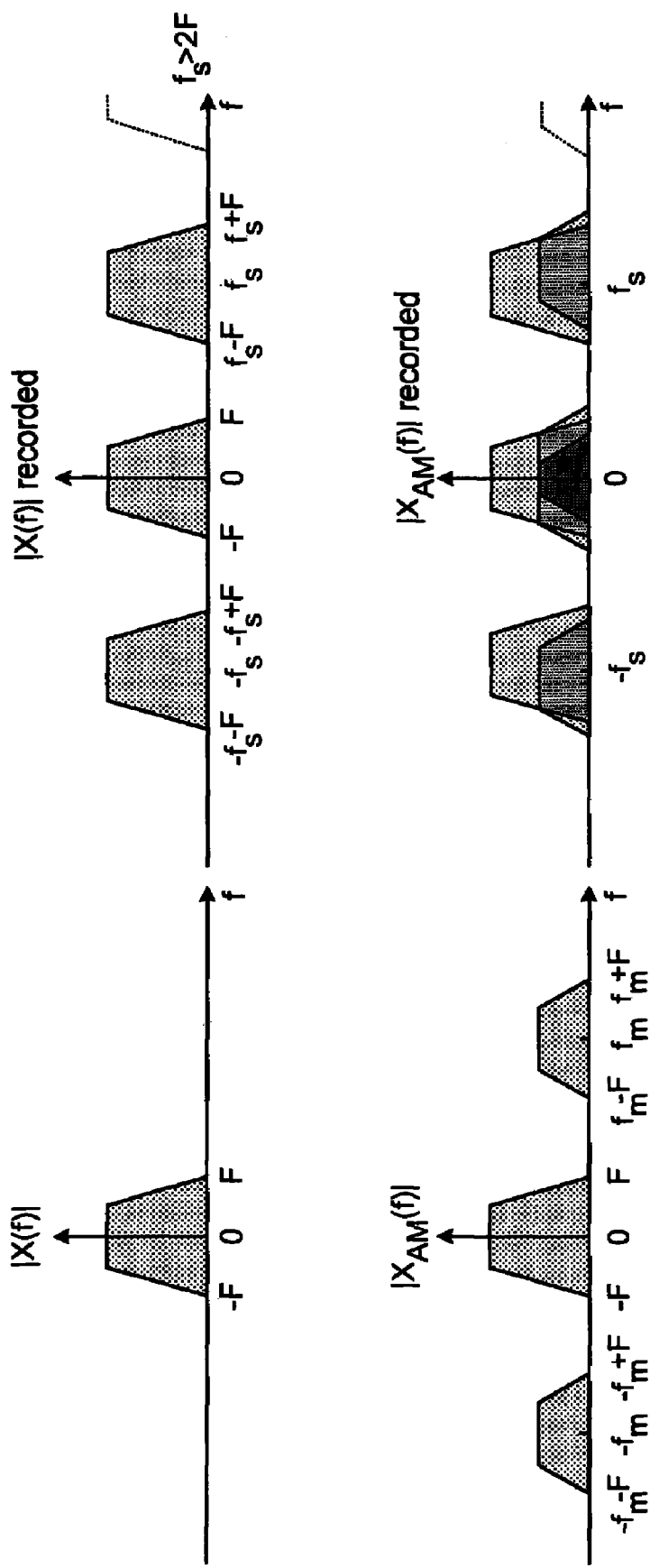
FIG. 8 represents four diagrams illustrating the method of the invention.
Figure 9:
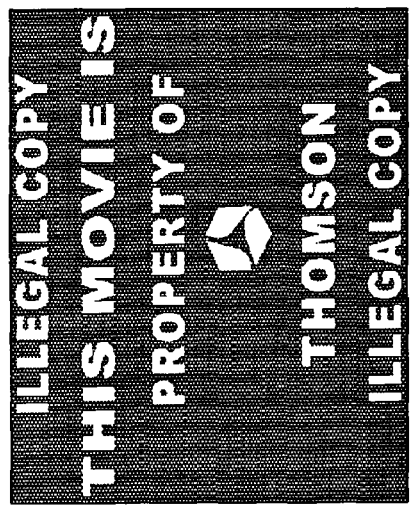
FIG. 9 shows an example of warning message.

FIG. 8 shows four diagrams in the frequency domain. A first diagram shows the spectrum of the base band signal X(f) representing the video signal. A second diagram shows the spectrum of the corresponding signal recorded by the camcorder. A third diagram shows the spectrum of the signal X(f) which is amplitude modulated on a carrier signal of frequency $f_m$. The resulting signal is called $X_{AM}(f)$. A fourth diagram shows the spectrum of the sampled modulated signal when the modulation frequency is close to a peak location given in the previous table.

Consequently, according the invention, a set of pixels locations are selected in order to form an anti-copy pattern e.g a warning message. An amplitude modulation is applied to these selected pixels such that the amplitude of the brightness of the selected pixels is modulated at a rate substantially equal to one of the frequency values given for the sidelobes in the previous table. Consequently, the modulation frequency is chosen among the frequency values f different from zero for which the derivative of the function sinc(πfτ) is zero where τ is the shutter integration time of the camcorder. The chosen modulation frequency is thus a local extremum of the function sinc(πfτ).

For example, if the frequency of the first sidelobe $$\left(f = \frac{4.4934095}{\pi T}\right)$$

is used as modulation frequency, the following modulation frequencies can be used:

$f_m$=71.51 Hz to overcome shutter settings of T=1/50 in PAL camcorders;

$f_m$=85.82 Hz to overcome shutter settings of T=1/60 in NTSC camcorders;

$f_m$=50.00 Hz in case shutter speed 1/T is set to higher values.

Of course, the modulation frequency can also be selected in a limited frequency range centered on the above-mentioned modulation frequencies $f_m$, for example in the range [$f_m$−Δ, $f_m$+Δ] where Δ is comprised between 5 and 15 Hz. For example if Δ=10 Hz, $f_m$ is selected in the range [61.51 Hz, 81.51 Hz] to overcome shutter settings of T=1/50 in PAL camcorders or [75.82 Hz, 95.82 Hz] to overcome shutter settings of T=1/60 in NTSC camcorders Other shutter configurations usually set exposure time T to lower values, and will let any of those two modulation frequencies go through.

Of course, the frequency of the second or third sidelobes can be used as modulation frequency.

Figure 10:
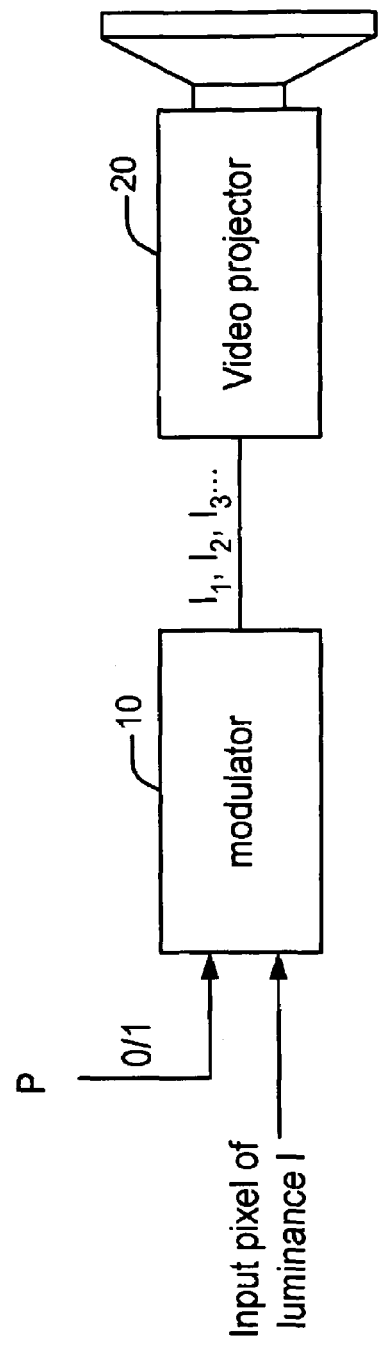
FIG. 10 shows a circuit implementation of the present invention.

An example of anti-copy pattern e.g a warning message is given in FIG. 10. Let M(x,y,t) be the brightness value (0 or 1) of the pixels of the warning message and C1(x,y,t), C2(x,y,t) and C3(x,y,t) the three color components of a pixel located on the coordinates (x,y) in space and the coordinate t in time. The triplet {C1,C2,C3} can be in a Red-Green-Blue color space (i.e. C1=Red, C2=Green and C3=Blue) or in a more HVS-friendly space, such as CIE XYZ or Yxy. The advantage of using non-RGB color spaces is to work in a linear theory-compliant domain.

For the modulation in the Red-Green-Blue color space, modulated pixel values {C1',C2',C3'} will be computed as follows:

$$\forall i \in [1, 3]$$
$$C'_i(x, y, t) = \begin{cases} C_i(x, y, t) \cdot (1 + \beta_i \cos(2\pi f_m t)) & \text{if } M(x, y, t) = 1 \\ C_i(x, y, t) & \text{if not} \end{cases}$$

where the modulation indexes $\beta_i$ are carefully chosen to be sure the pixel values do never reach saturation (for example 255 when the brightness values are coded in 8 bits).

FIG. 10 is a block diagram of a possible circuit implementation of the inventive method. The method is more particularly implemented in a modulator 10. It receives the pixel values of the images to be displayed. A signal P is also provided to the modulator. This signal indicates if the incoming pixel belongs to the anti-copy pattern or not.

Let I be the intensity of an incoming pixel (that is either R, G, B, or a combination of those) with a frame rate $f_r$ (e.g. $f_r$=24 Hz), and $I_1, I_2, I_3$ ... the outcoming modulated pixels with a frame rate $f_r'$. The amplitude of the luminance of the pixels of the anti-copy pattern is modulated with a modulation frequency $f_m$. The frame rate $f_r'$ is chosen to be equal or higher than twice the modulation frequency $f_m$ and preferably to be a multiple of $f_r$ (the conditions of the Nyquist-Shannon sampling theorem should be met by the video projector). For example, if $f_r'$=3 $f_r$, the modulator generates 3 pixel values $I_1$, $I_2$, $I_3$ for the pixel value I. The pixel values $I_1, I_2, I_3$ are defined such as:

$$I_n = I(1 + \beta\cos(2\pi f_m n / f_r'))$$

$$\text{for } n = 1 \text{ to } 3\left(= \frac{f_r'}{f_r}\right)$$

These modulated pixels are then displayed by a video projector 20.

The invention claimed is:

1. Method for processing a sequence of video images represented by their video signals comprising a modulation step for modulating temporally at a modulation frequency ($f_m$) the amplitude of the brightness of a set of pixels of each image of the sequence around a brightness value to be displayed for said image, wherein said modulation is chosen to be not visible to the human eye while simultaneously generating artifacts due to aliasing when said video images are captured by a digital video capturing device, wherein the modulation frequency ($f_m$) is selected to be in a given frequency range centered on a local extremum of the function sinc($\pi f\tau$), where the function sinc is the cardinal sine function, $\tau$ is the shutter integration time of the digital video capturing device, and f is the frequency, wherein, if said local extremum corresponds to frequency F, said given frequency range extends from F−Δ to F+Δ, Δ being comprised between 5 and 15 Hz.

2. Method according to claim 1, wherein the shutter integration time $\tau$ is selected to be equal to the inverse of the sampling frequency $f_s$ of the digital video capturing device.

3. Method according to claim 2, wherein the modulation frequency is selected to be in said given frequency range centered on the frequency 71.5 Hz or 122.9 Hz when the inverse of the shutter integration time of the digital video capturing device is equal to 50 Hz.

4. Method according to claim 2, wherein the modulation frequency is selected to be in said given frequency range centered on the frequency 85.8 Hz or 147.5 Hz when the inverse of the shutter integration time of the digital video capturing device is equal to 60 Hz.

5. Device for processing a sequence of video images represented by their video signals comprising a modulator for modulating temporally at a modulation frequency ($f_m$) the amplitude of the brightness of a set of pixels of each image of the sequence around a brightness value to be displayed for said image, wherein the modulation is chosen to be not visible to the human eye while simultaneously generating artifacts due to aliasing when said video images are captured by a digital video capturing device, characterized in that the frequency ($f_m$) used for the amplitude modulation is selected to be in given frequency range centered on a local extremum of the function sinc($\pi f\tau$) where the function sinc is the cardinal sine function, and $\tau$ is the shutter integration time of the digital video capturing device, and f is the frequency, wherein, if said local extremum corresponds to frequency F, said given frequency range extends from F−Δ to F+Δ, Δ being comprised between 5 and 15 Hz.

6. Device according to claim 5, wherein the shutter integration time $\tau$ is selected to be equal to the inverse of the sampling frequency $f_s$ of the digital video capturing device.

7. Device according to claim 6, wherein the modulation frequency is selected to be in said given frequency range centered on the frequency 71.5 Hz or 122.9 Hz when the inverse of the shutter integration time of the digital video capturing device is equal to 50 Hz.

8. Device according to claim 6, wherein the modulation frequency is selected to be in said given frequency range centered on the frequency 85.8 Hz or 147.5 Hz when the inverse of the shutter integration time of the digital video capturing device is equal to 60 Hz.

9. Device according to claim 5, wherein the images computed by the modulator are outputted at a frame rate that is equal to or higher than twice the modulation frequency.

10. Device according to claim 9, wherein the images computed by the modulator are outputted at a frame rate that is equal to a multiple of the frame rate at which the images are inputted into the modulator.

11. Device according to claim 5, wherein the digital video capturing device is a digital camcorder.

12. Method according to claim 1, wherein the digital video capturing device is a digital camcorder.

13. Method according to claim 2, wherein the digital video capturing device is a digital camcorder.

14. Method according to claim 3, wherein the digital video capturing device is a digital camcorder.

15. Method according to claim 4, wherein the digital video capturing device is a digital camcorder.

* * * * *